United States Patent
Chen et al.

(10) Patent No.: US 9,660,831 B2
(45) Date of Patent: May 23, 2017

(54) METHOD OF PACKAGING AND DISPLAYING AN E-MAIL

(75) Inventors: Xin Chen, Shanghai (CN); Wan Kei Ricky Ha, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 12/991,160

(22) PCT Filed: May 4, 2009

(86) PCT No.: PCT/IB2009/051811
§ 371 (c)(1),
(2), (4) Date: Nov. 5, 2010

(87) PCT Pub. No.: WO2009/136346
PCT Pub. Date: Nov. 12, 2009

(65) Prior Publication Data
US 2011/0055345 A1 Mar. 3, 2011

(30) Foreign Application Priority Data
May 9, 2008 (EP) ..................................... 08156003

(51) Int. Cl.
G06F 15/16 (2006.01)
H04L 12/58 (2006.01)
G06Q 10/10 (2012.01)

(52) U.S. Cl.
CPC ........... *H04L 12/58* (2013.01); *G06Q 10/107* (2013.01); *H04L 51/08* (2013.01)

(58) Field of Classification Search
CPC ....... G06Q 10/107; H04L 51/08; H04L 51/10; H04L 12/584; H04L 51/066;
(Continued)

(56) References Cited

U.S. PATENT DOCUMENTS 6,133,913 A  10/2000 White et al.
2001/0003823 A1  6/2001 Mighdoll et al.
(Continued)

FOREIGN PATENT DOCUMENTS

EP  1182639 A2  2/2002
JP  H06276222 A  9/1994
(Continued)

OTHER PUBLICATIONS

International Search Report—PCT/IB2009/051811.

*Primary Examiner* — Dustin Nguyen
*Assistant Examiner* — Hao Nguyen (57) ABSTRACT

A method of packaging and displaying an email, comprising the steps of creating an email having at least a first independent digital object and a corresponding first tag, and at least a first dependent digital object associated with the first independent digital object through said first tag; processing the email for extraction of said first dependent digital object for matching with the associated first independent digital object, thereby forming a first processed content; and displaying the email such that the first independent digital object and the first dependent digital object of the first processed content are presented simultaneously. According to the present invention both the sender composing the message, having at least an independent digital object and at least an associated dependent object, and the recipient to whom the message is presented, are faced with a user-friendly interface.

18 Claims, 9 Drawing Sheets

(58) Field of Classification Search
CPC ...... H04L 51/063; G06F 17/21; G06F 17/211;
G06F 17/241; H04N 21/4786; H04N
1/00212; H04N 1/00307; H04W 4/12
USPC ........ 709/206, 203, 231, 246; 715/239, 248,
715/730, 747, 763
See application file for complete search history.

(56) References Cited

U.S. PATENT DOCUMENTS

| | | | |
|---|---|---|---|
| 2002/0016818 A1* | 2/2002 | Kirani .............. | G06F 17/30902 709/203 |
| 2002/0138582 A1* | 9/2002 | Chandra ............. | G06Q 10/107 709/206 |
| 2003/0046348 A1* | 3/2003 | Pinto et al. .................. | 709/206 |
| 2003/0110297 A1 | 6/2003 | Tabatabai et al. | |
| 2003/0187936 A1* | 10/2003 | Bodin et al. ................. | 709/206 |
| 2003/0187996 A1* | 10/2003 | Cardina .............. | H04L 69/329 709/228 |
| 2004/0183830 A1* | 9/2004 | Cody et al. ................... | 345/752 |
| 2005/0021648 A1 | 1/2005 | Ogasawara et al. | |
| 2005/0055569 A1* | 3/2005 | Shipp .................. | G06Q 10/107 726/4 |
| 2005/0144653 A1* | 6/2005 | Creamer et al. .............. | 725/148 |
| 2005/0206947 A1 | 9/2005 | Kitahara et al. | |
| 2005/0257142 A1* | 11/2005 | Lai et al. ..................... | 715/523 |
| 2006/0010211 A1 | 1/2006 | Patrick et al. | |
| 2006/0033809 A1* | 2/2006 | Farley .................. | H04M 3/428 348/14.01 |
| 2006/0041632 A1 | 2/2006 | Shah et al. | |
| 2006/0156218 A1 | 7/2006 | Lee | |
| 2007/0094333 A1* | 4/2007 | Schilling et al. ............. | 709/206 |
| 2008/0016491 A1* | 1/2008 | Doepke ......................... | 717/104 |
| 2008/0082962 A1* | 4/2008 | Falk et al. ..................... | 717/113 |
| 2008/0282177 A1* | 11/2008 | Brown ............... | G06F 17/30265 715/763 |
| 2008/0311935 A1* | 12/2008 | Tysowski ....................... | 455/466 |
| 2009/0210270 A1* | 8/2009 | Quan et al. ........................ | 705/7 |
| 2012/0124143 A1* | 5/2012 | Chung et al. .................. | 709/206 |

FOREIGN PATENT DOCUMENTS

| | | |
|---|---|---|
| JP | 2001147871 A | 5/2001 |
| JP | 2002140265 A | 5/2002 |
| JP | 2005050323 A | 2/2005 |
| JP | 2005513831 A | 5/2005 |
| JP | 2005198080 A | 7/2005 |
| JP | 2006060820 A | 3/2006 |
| JP | 2006141000 A | 6/2006 |
| JP | 2007011879 A | 1/2007 |
| KR | 20020004417 A | 1/2002 |
| WO | 0203284 A1 | 1/2002 |
| WO | 2004104758 A1 | 12/2004 |

* cited by examiner

METHOD OF PACKAGING AND DISPLAYING AN E-MAIL

TECHNICAL FIELD OF THE INVENTION

The present invention relates to a method of packaging and displaying an email, comprising the steps of creating an email, processing the email for extraction, and displaying the email.

BACKGROUND ART

Until recently, looking at photographs often involved turning through pages in photo albums, and, if provided, reading descriptions associated with the ongoing activities of each photo. Nowadays, endless pictures are taken with for instance digital cameras and mobile phones, and looking at the pictures often involves viewing the digital photos on devices such as computer screens and mobile phone displays. Additionally, modern technology allows digital photos, and even other digital objects such as for instance video, audio and flash files, to be communicated from one entity to another. Photos may for instance be submitted from one computer to another over the Internet, as attachments to an email, and the pictures hence shared with the recipient(s) of the message.

Sharing of photos by means of email attachments represents a convenient, and for the user often simple, and known manner of communication. The ability for a sender to share attachment with a recipient is for instance described in US 2003/0187936, which relates to a method of email administration comprising in a transcoding gateway receiving an email including a digital object and display attributes for the digital object expressed in a tag language, and displaying the digital object in accordance with the display attributes. The transcoding gateway of US 2003/0187936 thus describes transcoding of messages from one format to another, for instance from digital objects in emails to transcoded digital objects suitable for display upon display devices such as video screens, audio players, digital art frames and television sets controlled by set-top boxes.

Viewing of received digital photos on a television set is subsequently possible. For most people, specifically the elderly, the TV set represents a familiar interface, allowing the elderly recipient of the email to view attached photos without the hassles associated with handling of new technologies such as mobile phones, PC's and the Internet.

However, although the ability to display for instance photos in an email on the television set may facilitate viewing for the recipient, the provision of for instance individual descriptions of the ongoing activities in the respective photos is challenging. A solution more sophisticated than gathering all the respective descriptions of the photos in the message body for the recipient to read, likely requires help of specialized software or dedicated websites.

Consequently, there is a need for an improved user interface and subsequently improved interaction design in packaging and displaying an email having attachments.

SUMMARY OF THE INVENTION

It is therefore an object of the present invention to provide a method of packaging and displaying an email of the type mentioned by way of introduction, in which the above-related drawbacks are eliminated wholly or at least partly.

According to the invention, a method of packaging and displaying an email is provided, comprising the steps of creating an email having at least a first independent digital object and a corresponding first tag, and at least a first dependent digital object associated with the first independent digital object through said first tag; processing the email for extraction of said first dependent digital object for matching with the associated first independent digital object, thereby forming a first processed content; and displaying the email such that the first independent digital object and the first dependent digital object of the first processed content are presented simultaneously.

The term "digital object" is, in the context of this application, to be understood in a broad sense, for example meaning any data in an email other than the ordinary text body and format headers of the email itself. A digital object may thus for instance be any one of a text, photo, audio, video or combined media file. In the most simple of cases, the digital object may even be plain text written to the message, to for instance the message body, in association with a tag.

Furthermore, the terms "sender" and "recipient" of an email are, in the context of this application, to be understood in a broad sense, including the person composing the message and the one reading it, respectively.

The present invention aims to facilitate the communication between for instance the elderly and their physically separated family members through a familiar interface. The children may send a message to the elderly using methods they are most familiar with, and the elderly may easily receive and be presented with the message without the hassles they are often faced with in handling new technologies. The method of packaging and displaying of an email introduced with the present invention enables for both the sender composing the message, which has at least an independent digital object and at least an associated dependent object, and the recipient to whom the message is presented, to be faced with a user-friendly interface. As the sender may insert/attach an independent digital object in a familiar manner, and then easily identify a dependent digital object to be associated with the independent digital object, there is no need for complicated specialized software or dedicated websites to link the digital objects to one another. Linking is enabled with the independent digital object having a tag, through which the dependent digital object is associated with the independent digital object.

Furthermore, as a result of the digital objects of the processed content being presented simultaneously, the independent digital object and the dependent digital object(s) it is associated with are consequently presented to the user at the same time. Thus, in the case where the independent digital object for instance is a digital photo, and the dependent digital object for instance is a plain text describing the ongoing activity in the photo, the describing text may be displayed as appended text along with the photo. Similarly, in the case where the dependent digital object instead is an audio file describing the ongoing activity in the photo, the audio file may be played along with display of the photo. Consequently, there is no need for the recipient to turn to a plurality of sources, such as e.g. the message body, to retrieve dependent digital objects associated with an independent digital object, whereby also the recipient is faced with a user-friendly interface.

An interface feasible at the recipient's end may for instance be a television set controlled by an end device, which may be a set-top box (STB) or set-top unit (STU). Such devices are most likely familiar to the recipient, and with this interface, in the case with the email comprising a photo and a describing text, the viewing experience for the recipient is realized through the TV set displaying the description as appended text along with the photo. The message body and the processed content, that is, the photo and describing text in this case, are preferably although not necessarily, presented separately.

A message, however, usually comprises a plurality of independent digital objects. Accordingly, in accordance with a preferred embodiment of the present invention, the email may furthermore comprise a second independent digital object having a corresponding second tag, and at least a second dependent digital object associated with said second independent digital object through said second tag. According to this embodiment, the step of processing furthermore comprises extraction of the second dependent digital object for matching with the associated second independent digital object, thereby forming a second processed content, and the step of displaying furthermore comprises presenting the second independent digital object and the second dependent digital object of the second processed content simultaneously and presenting the first and second processed contents sequentially.

With the ability given to attach a plurality of independent digital objects, for instance photos, having individual associated dependent digital objects, for instance descriptions of activities ongoing in the respective photos, it is thus possible to display the photos one by one sequentially, along with the associated descriptions appended. The sender is enabled to provide individual e.g. descriptions for multiple attached e.g. photos, in that the dependent objects are linked to the respective tags of the associated respective independent digital objects. The purpose of the tags is thus to arrange the layout and sequence of different parts of the email content according to the sender's wish. Consequently, the viewing experience may be enriched for the recipient, as the sender in a simple manner has the ability to arrange the photos and their respective dependent digital objects, as he pleases. In order to delimit the respective associations for each independent digital object, the message may for instance be arranged such that for the first and second independent digital objects, respectively, the corresponding tag is written to the email, followed by the associated dependent digital object, and the <ENTER> key (LF/CR).

The present invention furthermore enables for one dependent digital object, for instance plain text, to be associated with a plurality of photos. Vice versa, a photo may for instance be associated with a plurality of dependent digital objects, such as an audio file and a plain text. In the former case, the same text is displayed as appended text along with each photo, shown sequentially, and in the latter case, the text is displayed as appended text along with the photo meanwhile the audio file is played.

Other aspects, benefits and advantageous features of the invention will be apparent from the following description and claims.

BRIEF DESCRIPTION OF THE DRAWINGS

The invention will be more apparent from the accompanying drawings, which are provided by way of non-limiting examples.

DETAILED DESCRIPTION OF PREFERRED EMBODIMENTS OF THE INVENTION

In the following detailed description, preferred embodiments of the present invention will be described. However, it is to be understood that features of the different embodiments are exchangeable between the embodiments and may be combined in different ways, unless anything else is specifically indicated.

Figure 1:
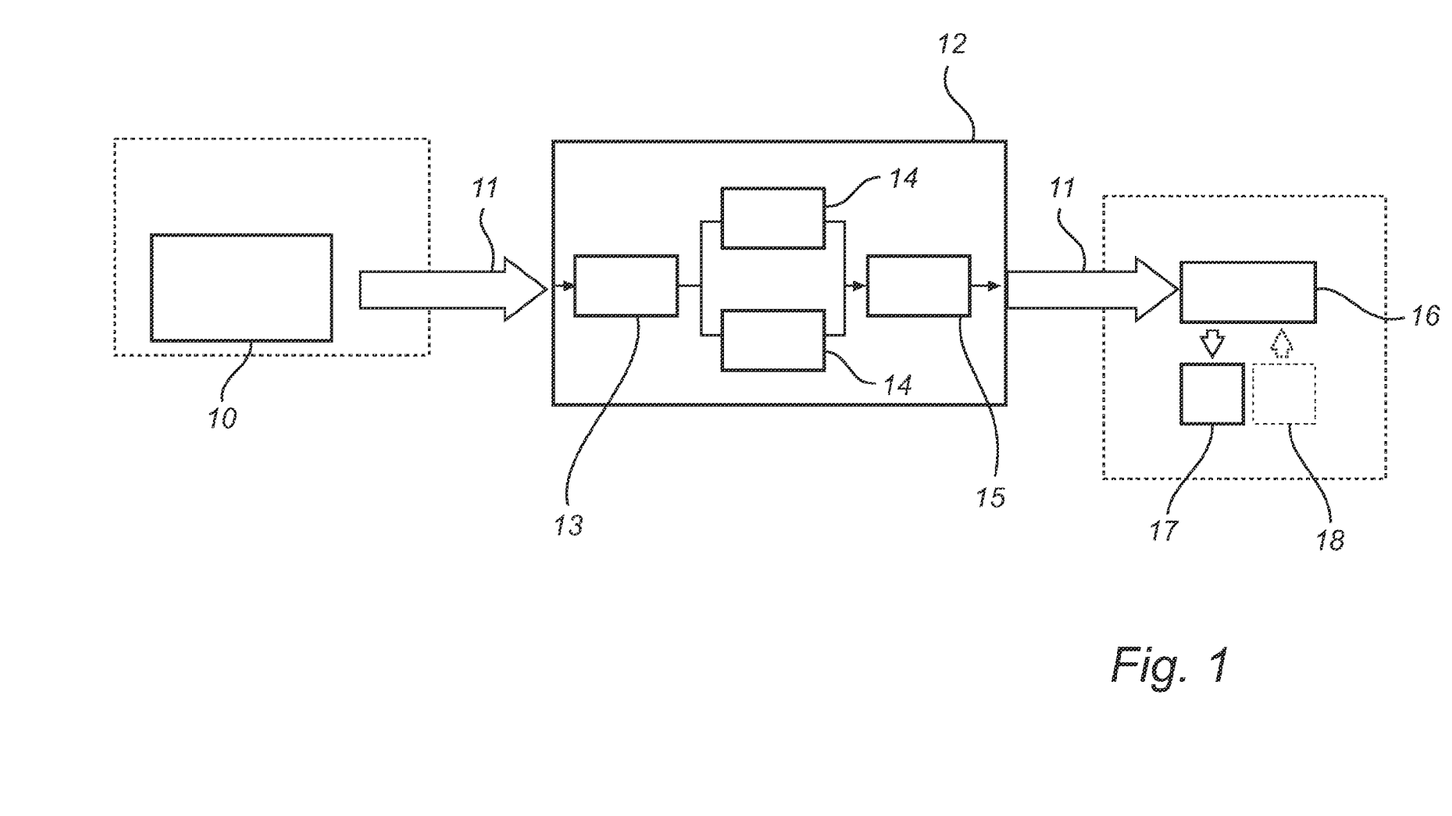
FIG. 1 is an exemplary system architecture for a first embodiment of the present invention.

Starting in FIG. 1 illustrating an exemplary system architecture for a first embodiment, a sender's end, a server 12 and a recipient's end are shown. In the sender's end an email 1 is created, in the server 12 the message 1 is processed, and in the recipient's end the email 1 is displayed. The server 12 may be an intermediate server, or may even be superfluous, should the processing of the message 1 alternatively be possible to perform in for instance the sender's or recipient's end.

The server 12 is connected to the sender's end and recipient's end, respectively, via the Internet 11. Although the Internet 11 is the suitable option in this first embodiment, other options such as WAN or LAN is likewise feasible. The sender's end comprises means for creation of the email 1, such as a PC 10. The server 12 comprises an email body parser 13, a photo attachment extractor 14 and a content processor 15. The recipient's end may comprise any means supporting reception and display of the message 1, such as PC 10 having a display. In the shown exemplary system architecture of FIG. 1, however, the recipient's end comprises an end device 16 connected to a television set 17. The end device 16 is here a set top box (STB) or set top unit (STU) controlling the TV set 17, enabling for reception of the email 1 and display on the TV 17. Although an STB is preferred, note that any end device 16 enabling the analogous functionality is feasible. Furthermore, an input device 18 may be attached to the end device 16 to allow interaction from the recipient of the message 1.

Figure 2:
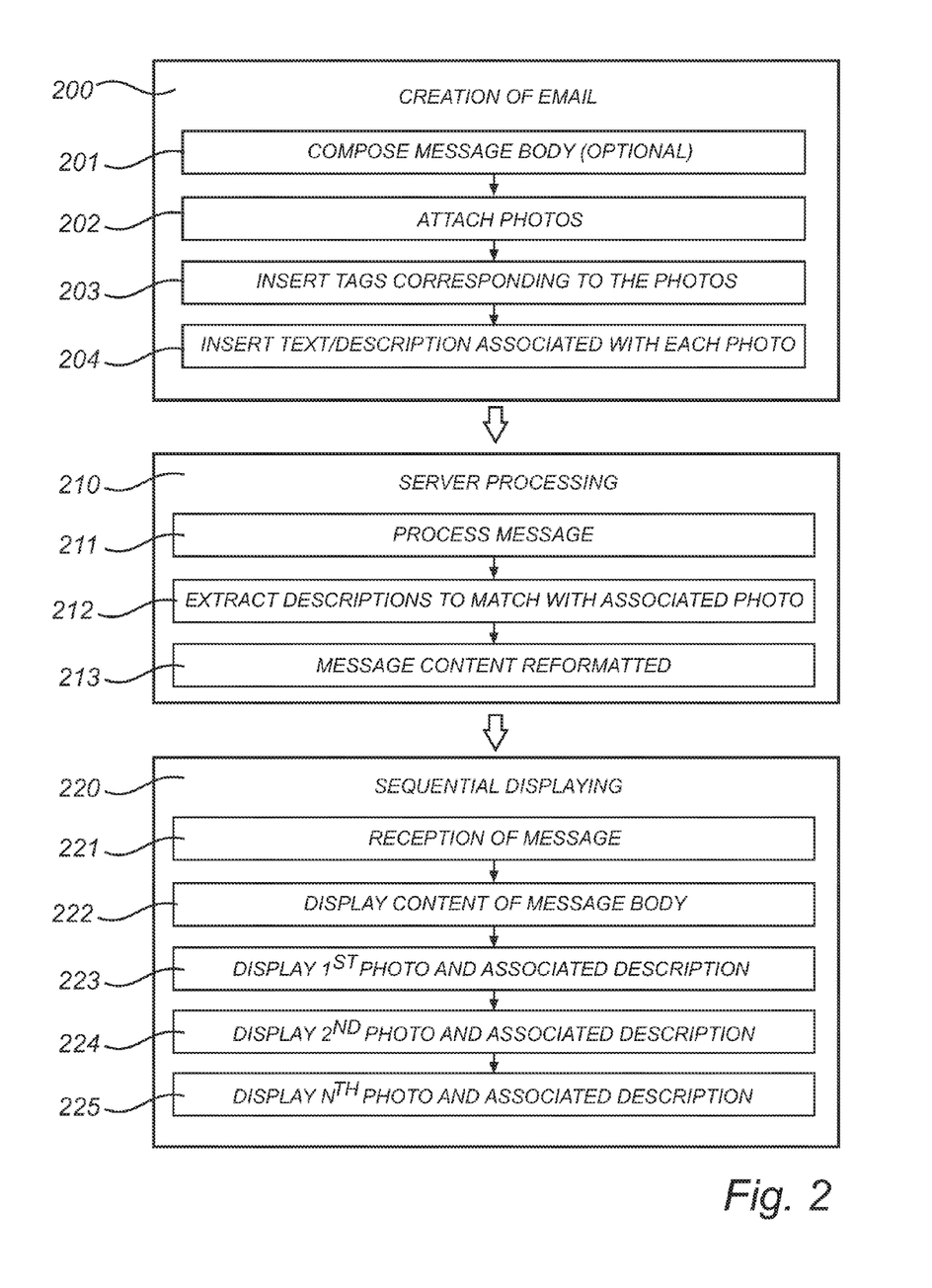
FIG. 2 shows a process flow according to the first embodiment of FIG. 1.
Figure 3A:
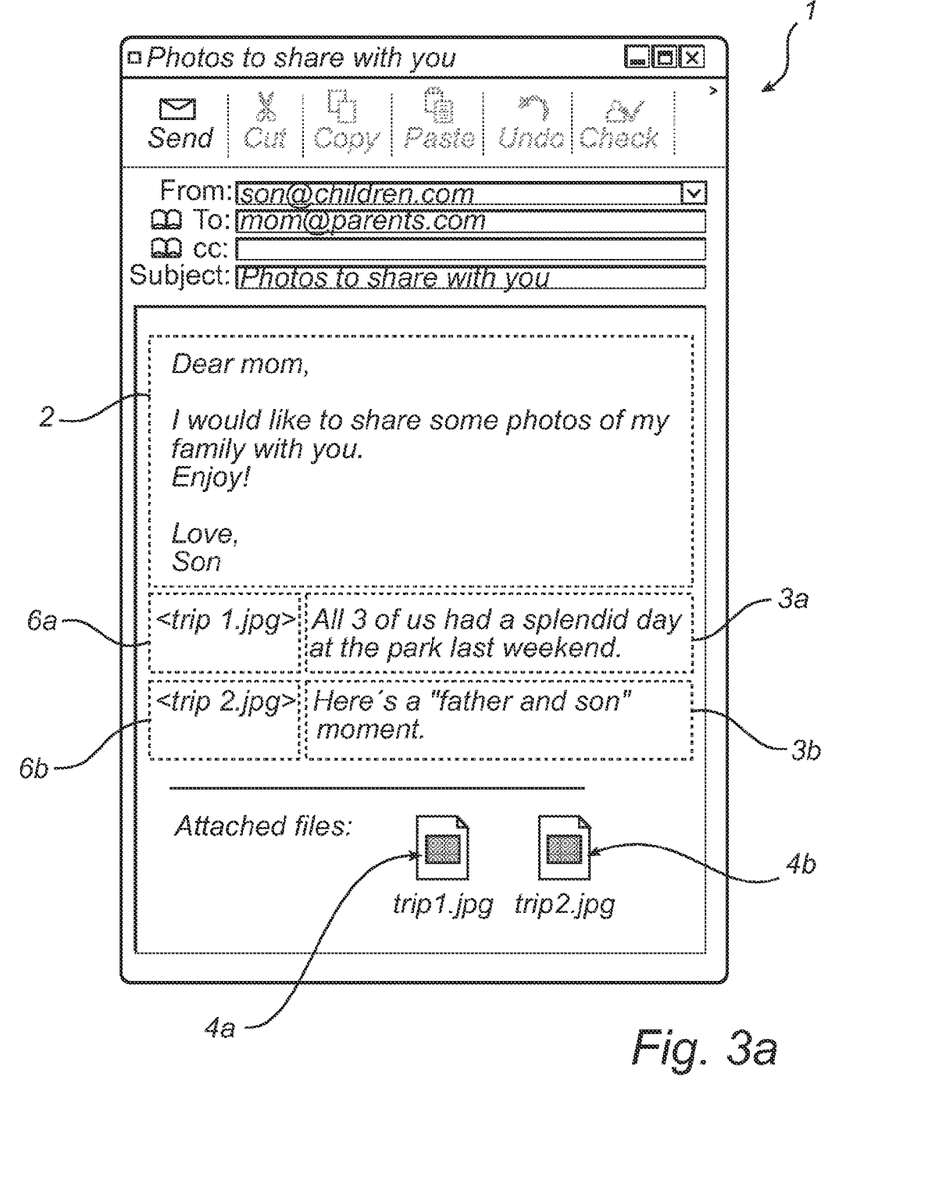
FIGS. 3A to 3C illustrates views associated with the process flow of FIG. 2.
Figure 3B:
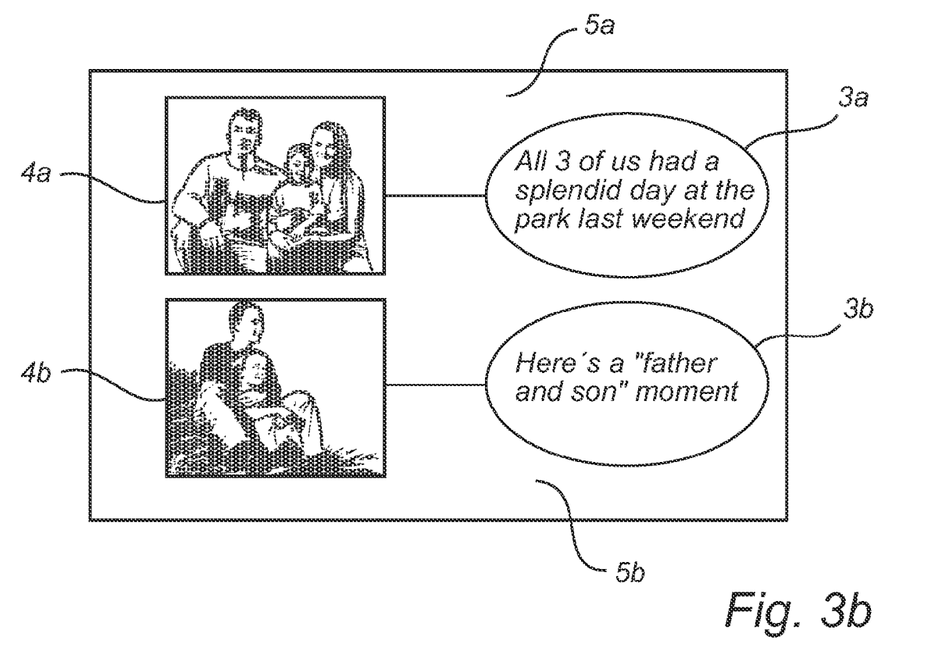
Figure 3C:
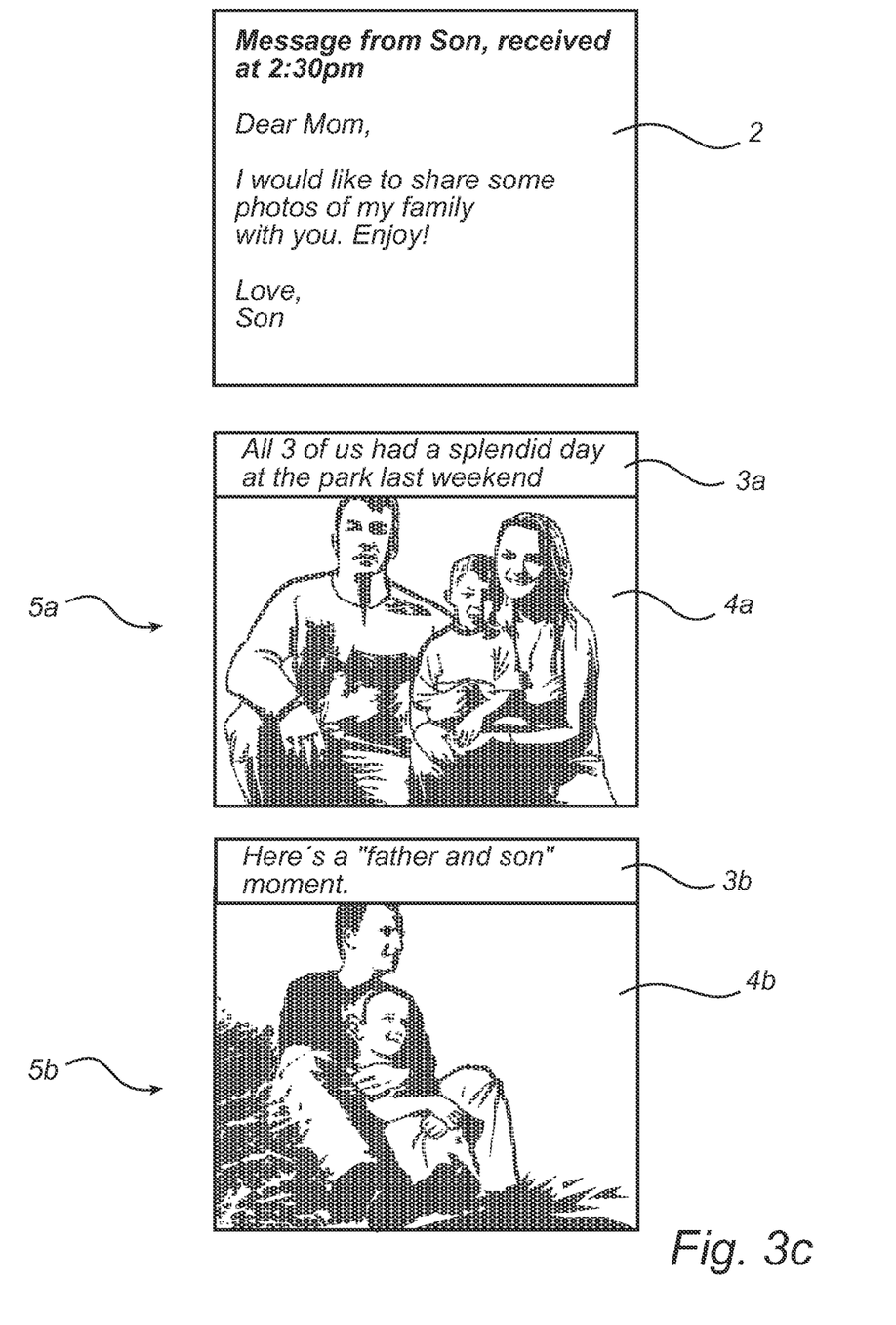

Exemplary steps of this first embodiment is showed in FIG. 2, which preferably is viewed in conjunction with FIGS. 3A to 3C, illustrating views associated with the provided steps of FIG. 2.

During operation at the sender's end, the email 1 is first created in a first step 200. This step 200 comprises sub steps 201 to 204 which will be explained in the following with illustrative views shown in FIG. 3A. Note that the sub steps 201 to 204 may be performed in any order preferred, and not necessarily as presented in FIG. 2. In step 201, the sender composes a message body 2 suitably comprising at least greetings. In a next step, step 202, a plurality of independent digital objects 4a, 4b, i.e. digital photos, are attached to the message 1. Although the independent digital objects in this first embodiment are photographs, the present invention is not restricted to this type of attachments. Any other type of digital objects such as for instance text, audio, video or combined media (e.g. flash) files, or a combination thereof, may likewise be attached. Furthermore, note that the number of photos is arbitrary, and not restricted to two as in this first embodiment.

In a step 203, tags 6a, 6b corresponding to the attached photos 4a, 4b are inserted into the message 1, which tags 6a, 6b preferably, but not necessarily, comprises the names of the photos 4a, 4b. The insertion may be performed by the sender writing the tags 6a, 6b to the message body 2, although an insertion automatically performed with the attaching of the photos 4 may be conceivable. More specifically, a tag 6a is added for photo 4a, such that the tag <trip1.jpg> corresponds the photo trip1.jpg, and a tag 6b is added for photo 4b such that <trip2.jpg> corresponds to the photo trip2.jpg. Although the special characters "<" and ">" have been chosen in this first embodiment to characterize the tags 6a, 6b, other special characters such as quotations marks, parenthesis or brackets may be utilized to enclose the file name. Likewise may omission of special characters be feasible, such that for instance the photo file name without any special characters represents the corresponding photo 6a, 6b.

In a next step 204 associated dependent digital objects 3a, 3b, here descriptions, of the respective photos 4a, 4b are inserted into the message 1. Preferably, and as shown in FIG. 3A, following the corresponding tag 6a, the sender writes the associated photo description 3a followed by the <ENTER> key (i.e. LF/CR or ↵) in order to delimit description text 3a. The same procedure is then repeated for photo 4b, that is, following the corresponding tag 6b the sender writes the associated photo description 3b followed by the <ENTER> key, resulting in:
<trip1.jpg> All 3 of us had a splendid day at the park last weekend. ↵
<trip2.jpg> Here's a "father and son" moment. ↵

Although the dependent digital objects 3a, 3b in this first embodiment consist of plain text, the invention is not restricted thereto. As will be shown further on, in the second embodiment, the dependent digital objects 3a, 3b may likewise be of any other type such as for instance photo, audio, video or combined media files, or a combination thereof.

Each photo description 3a, 3b is in the shown first embodiment linked, that is associated, to a single photo 4a, 4b, respectively. However, a photo description, for instance 3b, may likewise be linked to multiple photos 4a, 4b, should that be preferred (not shown). In that case, the same text description 3b would be associated with the plurality of photos 4a, 4b to which it is linked through for instance concatenation of the photo file names, such that
<photo1.jpg, photo2.jpg> Here's a "father and son" moment. ↵

After completion of composing the message 1 and submission of the same, the message 1 is up for processing in a step 210, preferably by a server 12 as described in conjunction with FIG. 2. Step 210 comprises sub steps 211 to 213, explained in the following with illustrative views shown in FIG. 3B. In step 211, the message 1 is processed, in form of the message body 2 for instance being parsed. Subsequently, in step 212, the respective descriptions 3a, 3b are extracted to be matched with the associated photos 4a, 4b, forming respective processed content 5a, 5b. The message 1 is then in step 213 formatted, preferably to a format suitable for display at the recipient's end, which subsequently will receive the message 1. Furthermore, in case of a long message body 2 or photo description 3a, 3b, an appropriate page segmentation may be performed.

After completion of processing the email 1, the message 1 is thus prepared for sequential displaying, starting with step 220. This step, which is performed at the recipient's end, comprises the sub steps 221 to 225 described in the following with illustrative views shown in FIG. 3C. Note that the sub steps 222 to 225 may be performed in any order preferred, and not necessarily as presented in FIG. 2. After reception of the message 1 by the end device 16 in step 221, the content of the message body 2 is with opening of the message 1, in step 222, displayed to the recipient on the television set 17. Then, automatically or by initiative from the recipient, the first photo 4a is selected and, in step 223, subsequently displayed along with the associated description 3a. In other words, the associated description 3a is displayed in parallel, that is, simultaneously with the photo 4a. Automatically, in a predetermined sequence, with a predetermined timing, or by yet another recipient initiative, the second photo 4b is then, in step 224, displayed along with the associated description 3b as appended text. The photos 4a, 4b are consequently presented sequentially along with their respective associated descriptions 3a, 3b, and, as preferred although not necessary, separately from the message body 2. Expressed in other words, the respective processed contents 5a, 5b, representing the photos 4a, 4b and their associated descriptions 3a, 3b, are presented sequentially. As the number of attached photos 4 as previously stated not is restricted to two, an $N^{th}$ photo 4n may be displayed along with its associated description 3n (not shown) in step 225.

Figure 4:
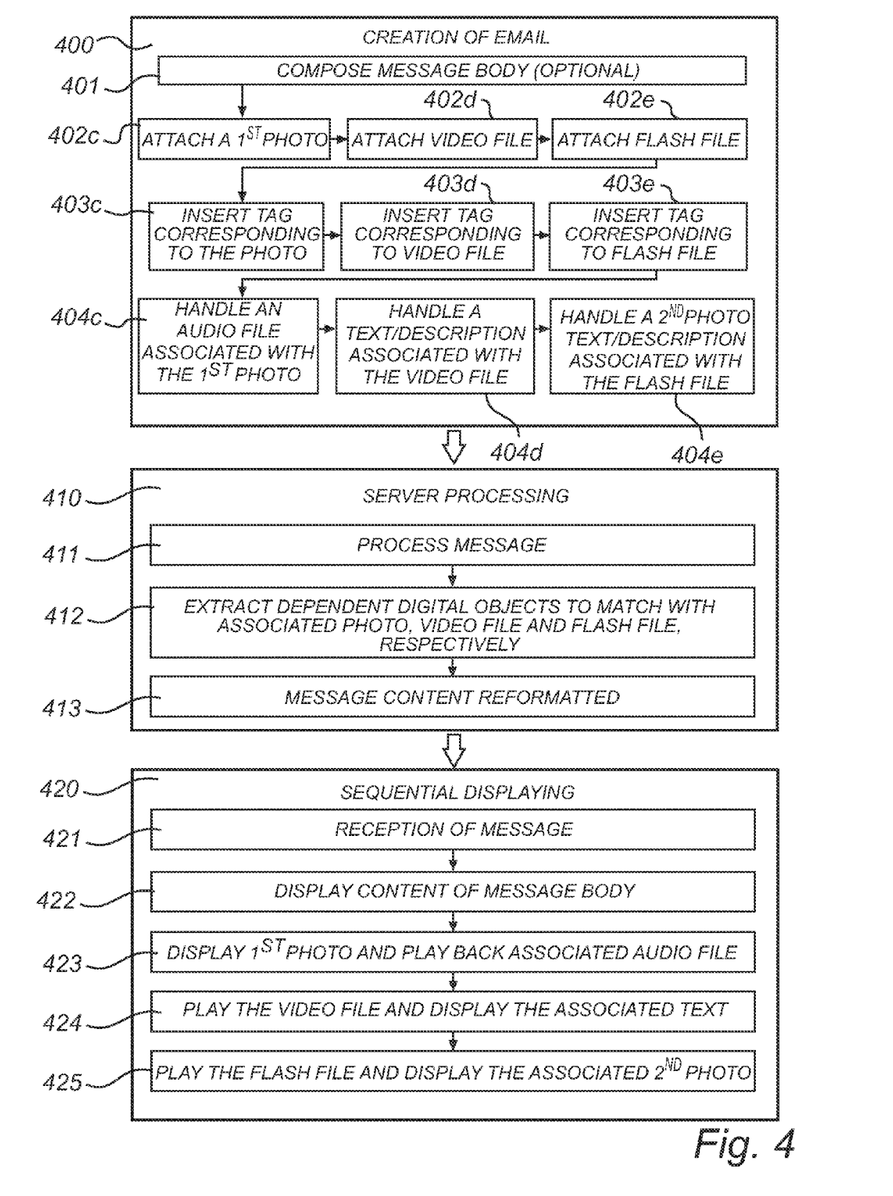
FIG. 4 shows a process flow according to a second embodiment of the present invention.
Figure 5A:
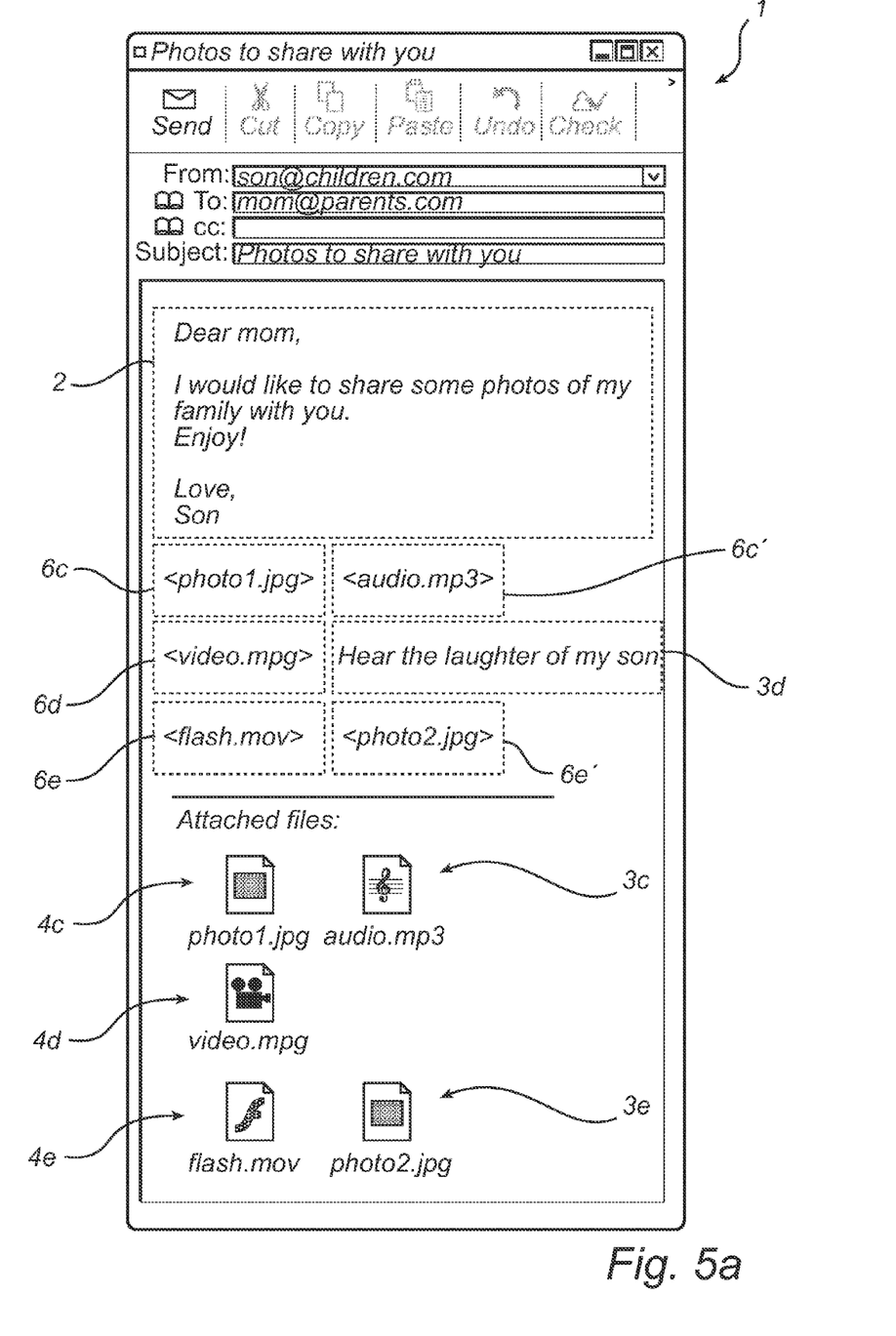
FIGS. 5A to 5C illustrates views associated with the process flow of FIG. 4.
Figure 5B:
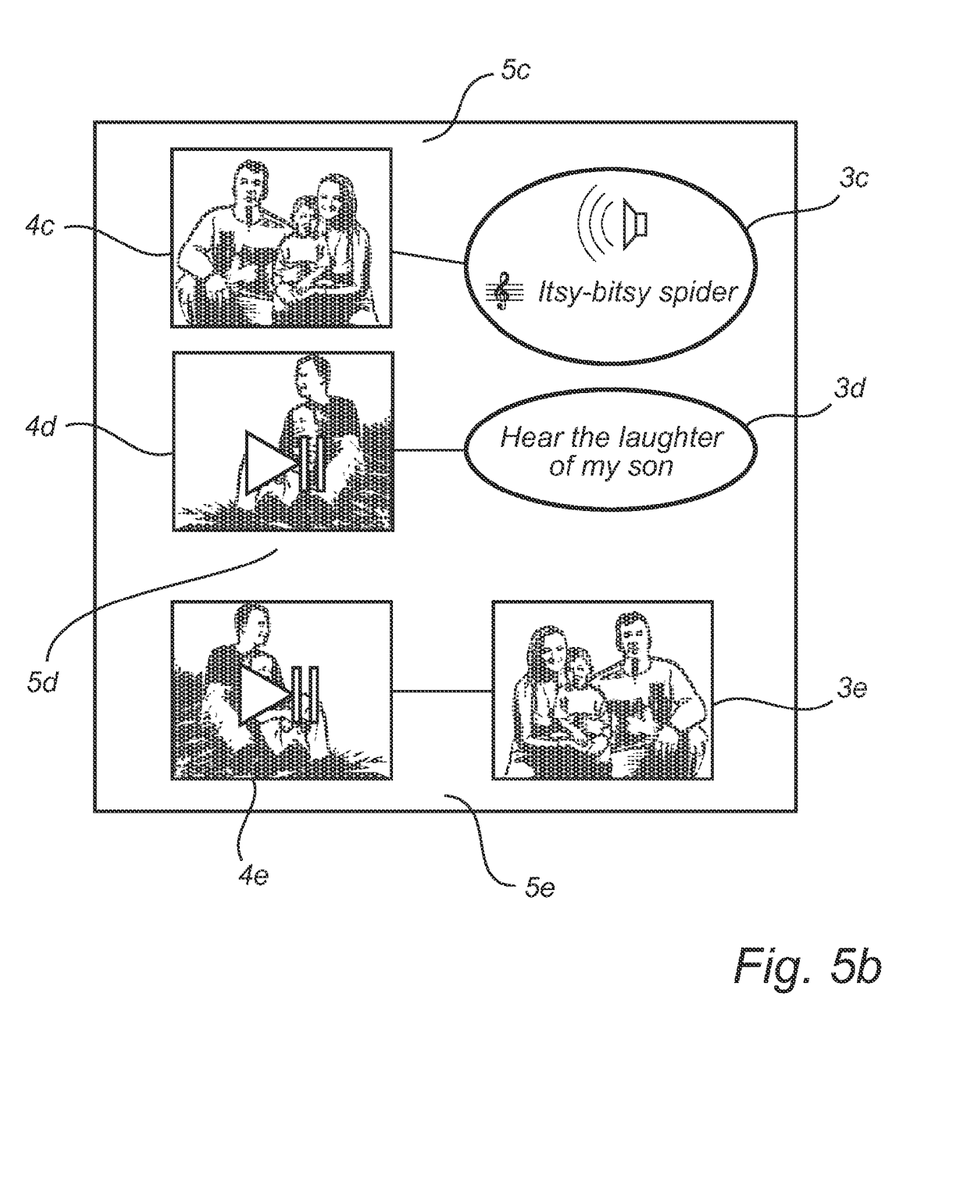
Figure 5C:
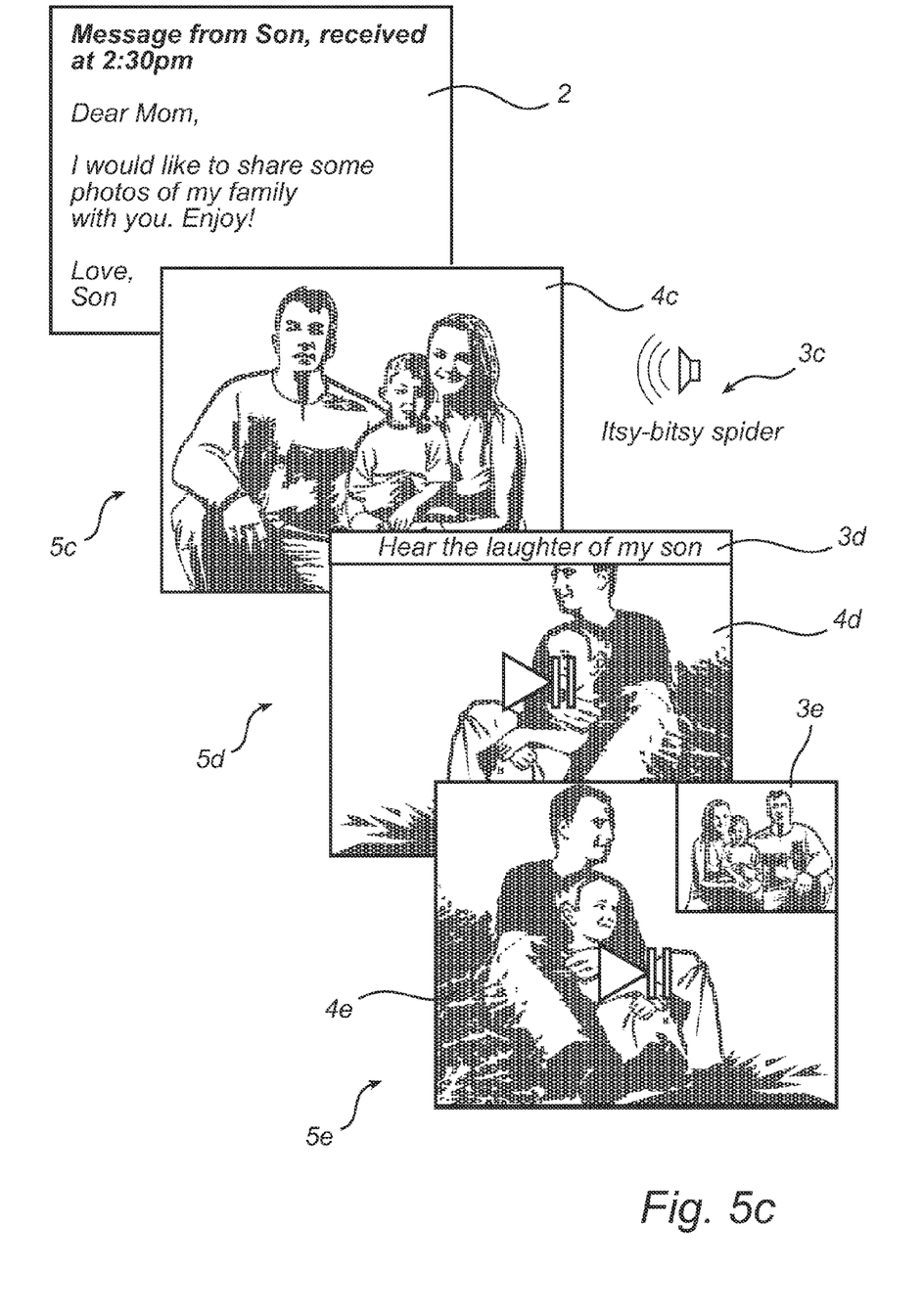

As insinuated in the foregoing, the present invention is not restricted to attaching and displaying of digital photos. Consequently, FIG. 4 illustrates the steps of a second exemplifying embodiment of the present invention, preferably viewed in conjunction with FIGS. 5A to 5C, illustrating views associated with the provided steps of FIG. 4. The steps in accordance with the second embodiment resembles those of the first embodiment, with the exception of additionally providing support for the digital objects—independent 4 as well as dependent 3—being of arbitrary type such as for instance text, photo, audio, video or combined media (e.g. flash) files, or a combination thereof. To avoid cluttering the description with unnecessary details, only differences in comparison between the two embodiments will be enlightened in the following, and details described in conjunction with the first embodiment applies to the second embodiment in all other aspects.

In a similar manner to FIG. 2, step 400 involves sub steps 401 to 404 performed at the sender's end with an illustrative view of the steps shown in FIG. 5A, step 410 involves sub steps 411 to 413 performed at the server 12 with an illustrative view of the steps shown in FIG. 5B, and step 420 involves sub steps 420 to 425 performed at the recipient's end with an illustrative view of the steps shown in FIG. 5C. As previously stated, the order of the sub steps may be altered, should that be preferred.

Following composing the email body 2 of the email 1 in step 401, a first photo 4c is, in step 402c, attached to the message 1. Then, in step 402d, a video file 4d is attached, followed by a flash file 4e in step 402e. In step 403c, a tag 6c corresponding to photo 4c is inserted into the message, along with a tag 6d corresponding to the video file 4d in step 403d and a tag 6e corresponding to the flash file 4e in step 403e. Next, in step 404c, a dependent digital object 3c, here an audio file comprising the song "Itsy-bitsy spider . . . ", associated with the first photo 4c is attached to the message 1, and a corresponding tag 6c' is inserted into the message body 2. In step 404d a dependent digital object 3d, here a plain text description, associated with video file 4d is inserted into the message body 2, and in step 404e another dependent digital object 3e, here a second photo, associated with the flash file 4e is attached to the message 1, and a corresponding tag 6e' is inserted into the message body 2. Consequently may an independent digital object 4 of any type be associated with a digital dependent object 3 of any type.

The arrangement of the tags 6c, 6d, 6e for the independent digital objects 4c, 4d, 4e in the message body 2, and the associated dependent digital objects 3c, 3d, 3e, is preferably similar to the arrangement described in conjunction with the first embodiment, resulting in the tag sequences:
<photo1.jpg><audio.mp3>↵
<video.mpg> Hear the laughter of my son. ↵
<flash.mov><photo2.jpg>↵

As previously mentioned, an independent object 4 may furthermore have a plurality of associated dependent digital objects 3. For instance, both an audio file 3c and a describing text 3d may be associated with the first photo 4c, which would result in the subsequent displaying of the photo 4c in parallel with the describing text 3d, with the audio file 3c played back simultaneously (not shown). Such a tag sequence may for instance be arranged as follows:
<photo1.jpg><audio.mp3> Hear the laugher of my son. ↵

Advancing now to the steps involving processing, the message 1 is in step 411 processed by the server 12. In this case, the server 12 shown in FIG. 1 preferably comprises elements requested for support of the second embodiment, enabling extraction of all the various attached files. In step 412, the dependent digital objects 3c, 3d, 3e are extracted to be matched with the associated independent digital objects 4c, 4d, 4e, respectively, forming respective processed content 5c, 5d, 5e. In step 413, the message content is then formatted. Arriving at the recipient's end, the message body 2 is in step 422, after reception of the message 1 in step 421, displayed. The first photo 4c is then displayed in step 423 along with the associated audio file 3c being played back simultaneously. Then, in step 424, the video file 4d is played along with display of the associated text 3d, followed by the flash file 4e in step 425 being played simultaneously with the second photo 3e being displayed. As described in conjunction with the first embodiment, each independent digital object 4c, 4d, 4e is thus presented in parallel with its associated dependent object (or objects (not shown)) 3c, 3d, 3e, and each independent digital object 4c, 4d, 4e is furthermore presented sequentially in relation to one another. Expressed in other words, the respective processed contents 5c, 5d, 5e representing the photos 4c, 4d, 4e and their associated descriptions 3c, 3d, 3e, are presented sequentially.

Consequently, with the introduction of the method of packaging and displaying an email in accordance with the present invention, an improved user interface and subsequently improved interaction design, have been presented.

The invention has now been discussed in relation to different embodiments. However, it should be appreciated by those skilled in the art that several further alternatives are possible. For example, the features of the different embodiments discussed above may naturally be combined in many other ways.

It will be appreciated by those skilled in the art that several such alternatives similar to those described above could be used without departing from the spirit of the invention, and all such modifications should be regarded as a part of the present invention, as defined in the appended claims.

The invention claimed is:

1. A method of packaging an email, comprising the acts of:
at a sender device:
a memory,
a processor accessing the memory:
creating an email having at least one destination address and a first content, the first content comprising:
a first independent digital object and a corresponding first tag, the corresponding first tag identifying the first independent digital object, and
at least one first dependent digital object associated with the first independent digital object, the at least one first dependent digital object being sequentially positioned to the corresponding first tag, wherein the at least one first dependent digital object comprises audio and textual information;
determining a type of display device associated with the at least one destination address for which the email is destined; and
formatting the first content into a format associated with the determined type of display device for displaying on the determined type of display device at the at least one destination address, wherein the independent object and associated at least one first dependent digital object are displayed in a sequential manner on a device separate from a device receiving the email; and
a transmitter controlled by the processor:
transmitting the email.

2. The method in accordance with claim 1, further comprising:
displaying the email on the display device associated with a destination address of the at least one destination address, wherein the display device is one of: a television set, a set-top box, a computer screen and a mobile phone display.

3. The method of claim 1, wherein t the sender device is located at one of: an intermediate server and a sender end.

4. The method of claim 1, wherein a message body of the email and the first content are presented separately.

5. The method of claim 1, wherein selected ones of each of the at least one first dependent digital object has a corresponding tag.

6. The method of claim 1, wherein the email further comprises:
a second content comprising:
a second independent digital object having a corresponding second tag, the corresponding second tag identifying the second independent digital object, and
at least one second dependent digital object associated with the second independent digital object sequentially positioned to the corresponding second tag, and the processor:
formatting the second content in a format associated with the determined type of display device for displaying the second content based on the determined type of display device, wherein the first content and second content are processed sequentially.

7. The method of claim 1, wherein the independent digital object is a photo and the dependent digital object associated with the photo is text describing the photo.

8. A computer program, stored in a computer-readable storage-medium that is not a transitory propagating signal or wave, including code which when executed on a computing device, wherein the computing device when accessing the code executes the steps of:
receive, in a receiving device, an email message comprising:
a first independent digital object and a first tag, the first tag identifying the first independent digital object, and a first dependent digital object associated with the first independent digital object sequentially positioned to the first tag, wherein the at least one first dependent digital object comprises audio and textual information;

extract from the email message the first independent object by accessing the first tag;

extract at least one the first dependent digital object for matching with the extracted first independent digital object positioned sequential to the first tag;

form a first processed content from the extracted first independent digital object and each of the at least one extracted first dependent object, determine a display device available for displaying the received email message;

format the first processed content into a format associated with the determined type of display device for display on the determined display device; and display on the determined type of display device, said display device being separate from the receiving device, wherein the independent digital objects and each of the at least one first dependent digital object of the first processed content are presented simultaneously.

9. A server comprising:

a content processor in communication with a memory:
  receiving an email comprising:
    a first tag associated with an independent digital object, the first tag identifying the independent object; and
    a corresponding at least one dependent digital object sequentially positioned to a corresponding first tag, wherein the at least one first dependent digital object comprises audio and textual information;
  extracting the at least one independent digital object from the email by accessing the first tag;
  extracting the corresponding at least one first dependent digital object matching with the extracted at least one first independent digital object,
  determining a type of display device associated with the email based on a destination address of the email;
  forming a first processed content from the at least one independent digital object and the matched corresponding at least one first dependent object;
  formatting the processed content in a format associated with the determined type of display device for displaying the processed content on the determined display device; and a transmitter:
  transmitting the email with the formatted processed content such that each of the at least one independent digital objects is displayed sequentially on a display device separate from a device receiving the email, wherein the first independent digital object and the corresponding at least one first dependent digital object of the first processed content are presented on the determined display device simultaneously.

10. A sender's end system comprising:

processing means for performing the acts of:
  receiving an email, on a receiving device, comprising:
    a first tag associated with each of at least one independent digital object, the first tag identifying an associated one of each of the at least one independent object; and
    at least one dependent digital object sequentially positioned to a corresponding first tag, wherein the at least one first dependent digital object comprises audio and textual information;
  extracting each of the at least one independent digital object by accessing the first tag associated with the at least one independent digital object;
  extracting each of the at least one first dependent digital object matching with the corresponding first independent digital object,
  determining a type of display device associated with destination address for which the email is intended;
  forming a first processed content from the each of the extracted at least one first independent digital object and each of the corresponding at least one extracted first dependent object;
  formatting the first processed content in a format associated with the determined type of display device for displaying the processed content on the determined type of display device at the associated destination address, said display device being different than the receiving device; and
  means for transmitting the email with the formatted processed content to the display device, wherein each of the first independent digital object and the corresponding at least one first dependent digital object of the first processed content are displayed on the display device simultaneously and separately from the email message.

11. A receiving system comprising:

Display means for display content; and
processing means for:
  receiving an email comprising:
    a first tag associated with each of at least one independent digital object; and
    a corresponding at least one dependent digital object sequentially positioned to a corresponding first tag, wherein the at least one first dependent digital object comprises audio and textual information;
  extracting each of the at least one independent digital object by accessing the first tag associated with a corresponding one of the at least one independent digital object;
  extracting each of the at least one first dependent digital object matching the corresponding first independent digital object,
  forming a first processed content from each of the independent digital objects and associated at least one dependent digital object;
  determining a type of display means associated with a destination address to which the email is destined with the receiving device, the display device being different than the receiving device;
  formatting the first processed content in a format associated with the determined type of display device for displaying the processed content on the determined type of display device; and
  displaying on the display means, the formatted processed content, each of the first independent objects in a sequential manner, wherein each of the first independent digital object and associated at least one of the first dependent digital object of the first processed content are presented simultaneously.

12. The method of claim 1, wherein each of the at least one first dependent object is associated with the first independent digital object through the first tag.

13. The computer program of claim 8, wherein the first dependent object is associated with the first independent digital object through the first tag.

14. The server of claim 9, wherein each of the at least one dependent digital object is associated with the first independent digital object through the first tag.

15. The sender's end system of claim 10, wherein each of the at least one dependent digital object is associated with the first independent digital object through the first tag.

16. The receiving system of claim 11, wherein each of the at least one dependent digital object is associated with the first independent digital object through the first tag.

17. A method of displaying an email at a destination address, the method comprising the acts of:
   at a receiving device:
      a receiver, associated with the destination address, receiving a received email; and
      a processor:
         processing the email, the processing comprising:
            accessing a first tag within the email;
            extracting a first independent digital object from the email associated with the first tag;
            extracting each of at least one first dependent digital object from the email matching the extracted first independent digital object, wherein the at least one first dependent digital object comprises audio and textual information;
         forming a first processed content from the extracted first independent digital object and each of the at least one extracted first dependent object;
         determining a type of display device associated with the destination address, the display device being separate from the receiver;
         determining whether the first processed content is in a form suitable for display on the determined type of display device;
         formatting the first processed content in a format associated with the determined type of display device for displaying the first processed content on the determined type of display device associated with the destination address when the first processed content is not in a format suitable for display; and
         displaying, on the display device, the first independent digital object and the at least one of the first dependent digital object simultaneously.

18. A tangible computer-readable storage-medium that is not a transitory propagating signal or wave, the medium modified by control information including instructions for performing a method of packaging an email, the method comprising the acts of:
   at a sender device:
      a processor:
         creating an email having at least one destination address and a content, the content comprising:
            a first independent digital object and a corresponding first tag identifying the first independent digital object, and
            at least one first dependent digital object associated with the first independent digital object sequentially positioned to the corresponding first tag, wherein the at least one first dependent digital object comprises audio and textual information;
         determining a type of display device associated with the at least one destination address for which the email is destined; and
         formatting the first content into a format associated with the determined type of display device for displaying on the determined type of display device at the at least one destination address, wherein the first content is displayed separately on the display device, wherein the display device is different than the receiving device; and a transmitter controlled by the processor:
      transmitting the email.

* * * * *